(12) United States Patent
Martino et al.

(10) Patent No.: US 8,713,012 B2
(45) Date of Patent: Apr. 29, 2014

(54) MODULAR AUTHORING AND VISUALIZATION OF RULES USING TREES

(75) Inventors: Jacquelyn A. Martino, Yorktown Heights, NY (US); Paul M. Matchen, Yorktown Heights, NY (US); Rosario A. Uceda-Sosa, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/497,319

(22) Filed: Jul. 2, 2009

(65) Prior Publication Data

US 2011/0004632 A1    Jan. 6, 2011

(51) Int. Cl.
    *G06F 7/00* (2006.01)
(52) U.S. Cl.
    USPC ........... 707/736; 707/759; 707/765; 707/802; 715/700; 715/764
(58) Field of Classification Search
    USPC .................. 707/999.102, 736, 759, 765, 802; 715/700, 764
    See application file for complete search history.

(56) References Cited

U.S. PATENT DOCUMENTS

| | | | |
|---|---|---|---|
| 5,175,814 A * | 12/1992 | Anick et al. | 707/999.004 |
| 5,471,613 A * | 11/1995 | Banning et al. | 707/999.004 |
| 5,701,456 A | 12/1997 | Jacopi et al. | |
| 5,721,900 A | 2/1998 | Banning et al. | |
| 5,790,778 A | 8/1998 | Bush et al. | |
| 5,933,145 A | 8/1999 | Meek | |
| 6,026,388 A | 2/2000 | Liddy et al. | |
| 6,925,608 B1 | 8/2005 | Neale et al. | |
| 2003/0200208 A1 * | 10/2003 | Sajwan et al. | 707/3 |
| 2004/0039730 A1 * | 2/2004 | Saeki | 707/2 |
| 2004/0172520 A1 | 9/2004 | Smit et al. | |
| 2005/0222980 A1 * | 10/2005 | Lee | 707/3 |
| 2005/0262056 A1 * | 11/2005 | Hamzy et al. | 707/3 |
| 2006/0195427 A1 * | 8/2006 | Kilroy | 707/3 |
| 2008/0109475 A1 | 5/2008 | Burmester et al. | |

OTHER PUBLICATIONS

Hildreth, Sue, Rounding Up Business Rules, Computerworld, May 23, 2005, www.computerworld.com/printthis/2005/0,4814,101844,00.html.

U.S. Office Action mailed Apr. 19, 2012 in related U.S. Appl. No. 12/497,378.

* cited by examiner

*Primary Examiner* — Hosain Alam
*Assistant Examiner* — Jieying Tang
(74) *Attorney, Agent, or Firm* — Scully, Scott, Murphy & Presser, P.C.; Daniel P. Morris, Esq.

(57) ABSTRACT

The system and method in one aspect provide a set of extended Boolean operators and a tree visual paradigm that enable business users to modularize the construction of a rule and visualize it as the rules is being built.

20 Claims, 4 Drawing Sheets

MODULAR AUTHORING AND VISUALIZATION OF RULES USING TREES

CROSS-REFERENCE TO RELATED APPLICATIONS

This application is related to co-owned U.S. patent application Ser. No. 12/497,370 entitled "METHOD AND SYSTEM FOR SMART MARK-UP OF NATURAL LANGUAGE BUSINESS RULES" and U.S. patent application Ser. No. 12/497,378 entitled "INTUITIVE VISUALIZATION OF BOOLEAN EXPRESSIONS USING FLOWS," filed on Jul. 2, 2009. Those applications are incorporated herein by reference in their entirety.

BACKGROUND

The present application generally relates to information management systems, and more specifically to modular authoring and visualization of rules using trees.

Decisions made by business enterprises can be represented by one or more business rules. As used herein the term "rule" refers to one or more actions or operations that are performed upon the satisfaction of one or more conditions. A "business rule" refers to one or more business actions or business operations that are performed upon the satisfaction of one or more conditions. For example, in the context of a financial company that issues credit cards, the process for determining whether to offer a credit card to a particular individual based upon particular financial or demographic information can be represented by one or more business rules.

Formulating business decisions into business rules allow those business decisions to be automated using computer software. That is, the business logic and conditions defined by business rules can be embodied in computer software. Referring to the prior example, it is not uncommon for financial companies to automate, using computer software, the decision about whether a credit card should be offered to a particular individual. Conventionally, these types of computer systems use complex customized software to implement business rules.

A significant problem with using custom software to implement business rules is that the people in business organizations who decide on changes to business rules generally cannot themselves implement those changes in the computer software. When business logic or conditions change, the computer software must be updated to reflect the change. For example, in the context of issuing credit cards, if the minimum salary requirement is changed from X to Y, then the software must be manually updated to reflect the change in the minimum salary requirement from X to Y. Updating computer software generally requires technical expertise that the business people who decide the business rules may not have. These people are often financial analysts or high-level managers. Updating the software typically involves changing values in source code or data files and then "rebuilding" the software, which requires recompiling source code to generate object code and then linking the object code with libraries of other object code to generate a new runtime executable.

Rule engines have become critical in today's businesses. Some of the major reasons for this need are identified as: 1. the businesses' need to react quickly to a rapidly changing environment; 2. the growing prevalence of less technical users who are becoming responsible for building, editing and validating rules of the business (the business user); 3. an increased demand for businesses to create audit trails; 4. a "patch" for legacy systems; and 5. interest in business process management and integration with service oriented architectures.

Existing systems remain focused on the highly technical user and as such are not easy to use for business users. The existing solutions also force a top-down methodology whereby the user must understand the entire intent of a rule before being able to manipulate it. These solutions employ methods such as tables or spreadsheet type inputs and/or large decision trees. While such methods may be very effective for solving simple systems of rules, they become untenable for medium and large systems of rules. A trend in the known solutions is to use iconic representation, visual systems and natural language to represent rules in the system. Such methods promise increased ability to handle medium and larger systems of rules, yet they do so with the user as the primary composer of the formalized rule.

Users want to make business policy maintenance an activity of business users rather than developers. In industries like banking, insurance, marketing or travel, business users should be able to author and manage their business knowledge directly, without involving the IT (information technology) departments. However, business users may encounter difficulty in formalizing those rules in Boolean logic, that is, writing rules using expressions that involve the operators such as AND, OR and NOT.

BRIEF SUMMARY

A system and method of modularly authoring and visualizing rules using trees are provided. The method in one aspect may comprise parsing a natural language expression and determining a plurality of logic words used in the natural language. The method may also comprise receiving one or more user selected portions of said natural language expression and converting said one or more user selected portions of said natural language expression into corresponding logical Boolean expressions based on said plurality of logic words. The method may further comprise presenting one or more extended Boolean operators and aggregating said logical Boolean expressions into said one or more extended Boolean operators. The method yet further may comprise building a parse tree comprising said aggregated logical Boolean expressions.

A system for modularly authoring and visualizing rules using trees, in one aspect may comprise ontology of words database and a parser module that parses a natural language expression. An analysis module is operable to determine a plurality of logic words used in the natural language based the ontology of words database. The module may be further operable to receive one or more user selected portions of said natural language expression, convert said one or more user selected portions of said natural language expression into corresponding logical Boolean expressions based on said plurality of logic words, present one or more extended Boolean operators, aggregate said logical Boolean expressions into said one or more extended Boolean operators, and build a parse tree comprising said aggregated logical Boolean expressions.

A program storage device readable by a machine, tangibly embodying a program of instructions executable by the machine to perform methods described herein may be also provided.

Further features as well as the structure and operation of various embodiments are described in detail below with ref-

DETAILED DESCRIPTION

A set of extended Boolean operators and a visual tree paradigm are provided that enable users to modularize the construction of rules. The set of operators may be provided as part of a graphical user interface. A method and system of the present disclosure can translate a fully specified rule.

The extended operators may include the following. Those operators are n-ary, meaning they can take any number of operands.

ALL: means all of the constraints are true. ALL is equivalent to AND.
ANY: means any of the constraints is true. ANY is equivalent to OR.
NONE: means none of the constraints are true. NONE is equivalent to NOT OR
NOT ALL: means not all of the constraints are true. NOT ALL is equivalent to NOT AND.

The above extended Boolean operators can express all of Boolean logic. This set of operators can obviate the need for the NOT operator when applied to complex expressions and can facilitate the authoring and visualizing of a rule.

While the extended Boolean operators and tree visualization may be applied to many general expression languages, the following simple example is described for illustrative purposes. An example expression may have the form:
LHS RelationalOperator RHS
or
Collection CollectionPredicate,
where LHS can be a simple object, a collection or a property, and RHS can be a collection, a simple object, a property or a constant.

The RelationalOperator may be any one of:
<(less than)
<=(less than or equal to)
(greater than)
>=(greater than or equal to)
!=(not equal to)
==(equals).

The CollectionPredicate may be any one of:
IsEmpty, IsNotEmpty.

Standard semantics may be used for the above predicates. Standard semantics refers to a term's standard denotational semantics, i.e. its "meaning" in a language according to the standard interpretation of that term. This is usually given by a semantic function which maps a term in the abstract syntax to a point in a domain. The domain is the interpretation of the term's type. The semantic function also takes an environment—a function which maps the free variables of the term to their meaning. A domain point "denotes", or "is the denotation of", a term. A non-standard semantics results from other interpretation, e.g. an abstract interpretation.

Figures 1, 2:
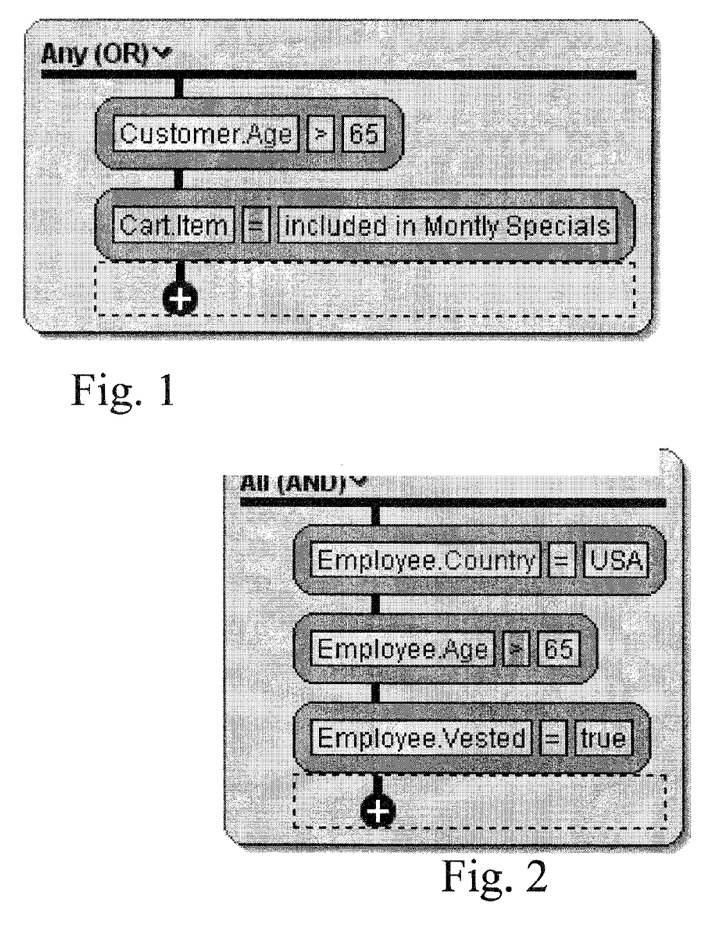
FIG. 1 illustrates a Boolean expression "If ANY of the following constraints is met, then the condition is true".
FIG. 2 illustrates a Boolean expression "If ALL of the following constraints are met then the condition is true".

FIG. 1 illustrates a Boolean expression "If ANY of the following constraints is met, then the condition is true" presented via a user interface program. In this example, if "Customer.age>65" OR "Cart.Item=included in monthly specials", then the condition or the expression is true. The ANY operator, for example, as shown in FIG. 1 allows the user to identify more easily whether the user's intent for conditions has been correctly interpreted by the system as a logical expression. The ANY operator also allows the user to think in natural language, i.e. "Any", while the system interprets the logical equivalent, i.e. "or".

FIG. 2 illustrates a Boolean expression "If ALL of the following constraints are met then the condition is true". In this example, if "Employee.Country=USA" AND "Employee.Age>65" AND "Employee.Vested==true", then the condition is met. As in the ANY operator, the user is able to easily identify whether the user's intent for conditions is correctly expressed. The ALL operator also allows the user to think in natural language, i.e. "all", while the system interprets the logical equivalent, i.e. "and".

Figure 3:
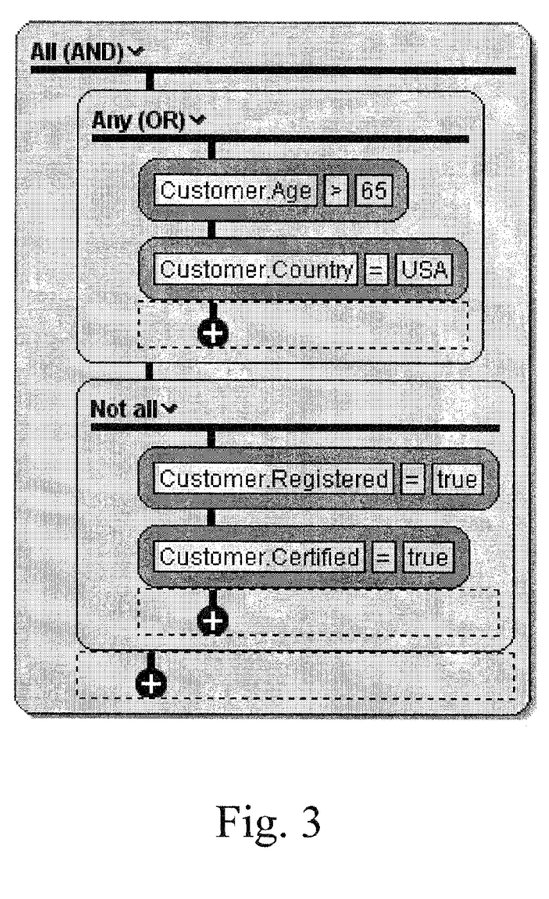
FIG. 3 illustrates a Boolean expression, "ALL of the following conditions need to be met".

FIG. 3 illustrates a Boolean expression, "ALL of the following conditions need to be met" in a nested format. This expression illustrates a case where ALL of the following conditions need to be met: ANY of either "Customer.Age>65" or "Customer.Country=USA"; NOT All of either "Cusomer.Registered==true" or "Customer.Certified==true". The operators such as ALL or ANY provided in the present disclosure allow users to express the rules in plain or natural language logic rather then in mathematical Boolean logic.

The following describes the tree paradigm of the present disclosure in one embodiment. Suppose the user wants to formalize the rule:

"Upgrade airline ticket class to business for all European managers or other managers who are over 65 years old and traveling internationally, except for those in research."

The above natural language may be formalized into Boolean logic, for example, for use by a computer or autonomous system, as:

IF Category=Manager AND (Area=Europe OR NOT (Department=Research AND NOT (Age>65 OR AirReservation.type=International))) THEN AirReservation.class=Business For a business user to construct this formalized rule from the natural language, for example, the English description above, it is easier to build the IF=expression (the expression between the IF and the THEN) in a bottom up fashion. The tree visualization paradigm of the present disclosure modularizes the Boolean expression.

Figure 4:
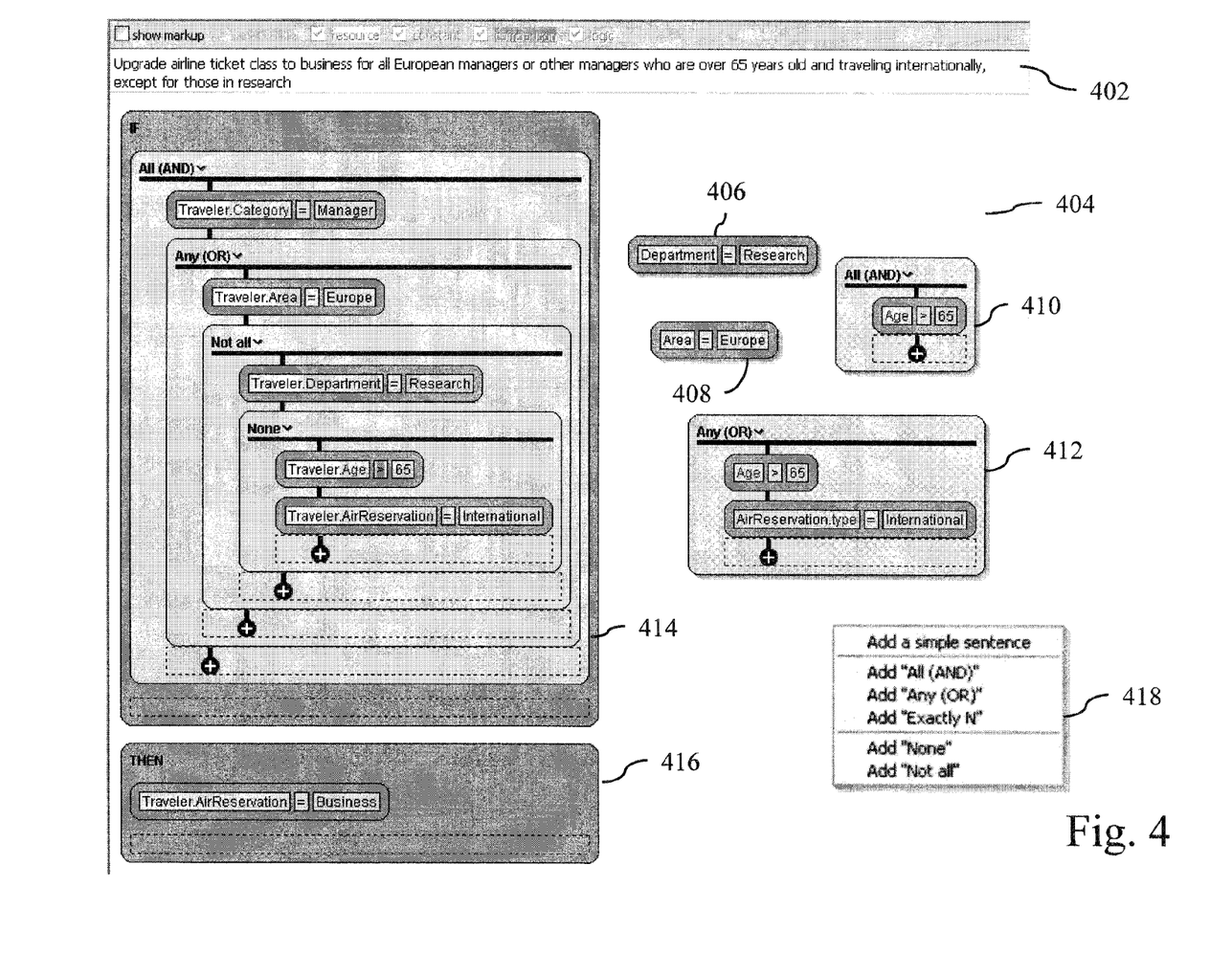
FIG. 4 shows a tree diagram of a Boolean expression from IF to THEN.

FIG. 4 shows a tree diagram of a Boolean expression derived from a rule according to one embodiment of the present disclosure. The example shown is of the above discussed rule.

The system and method of the present disclosure in one embodiment simplifies the recursive structure of a general Boolean expression, for example, by eliminating the need to use a separate NOT. In another aspect, the system and method of the present disclosure also facilitate the visual parsing of the expression and working with the expression in a modular way. To facilitate the visual parsing the visualization provides a structured view of the rule being authored and allows for an unambiguous understanding of the rule's logic.

Figure 5:
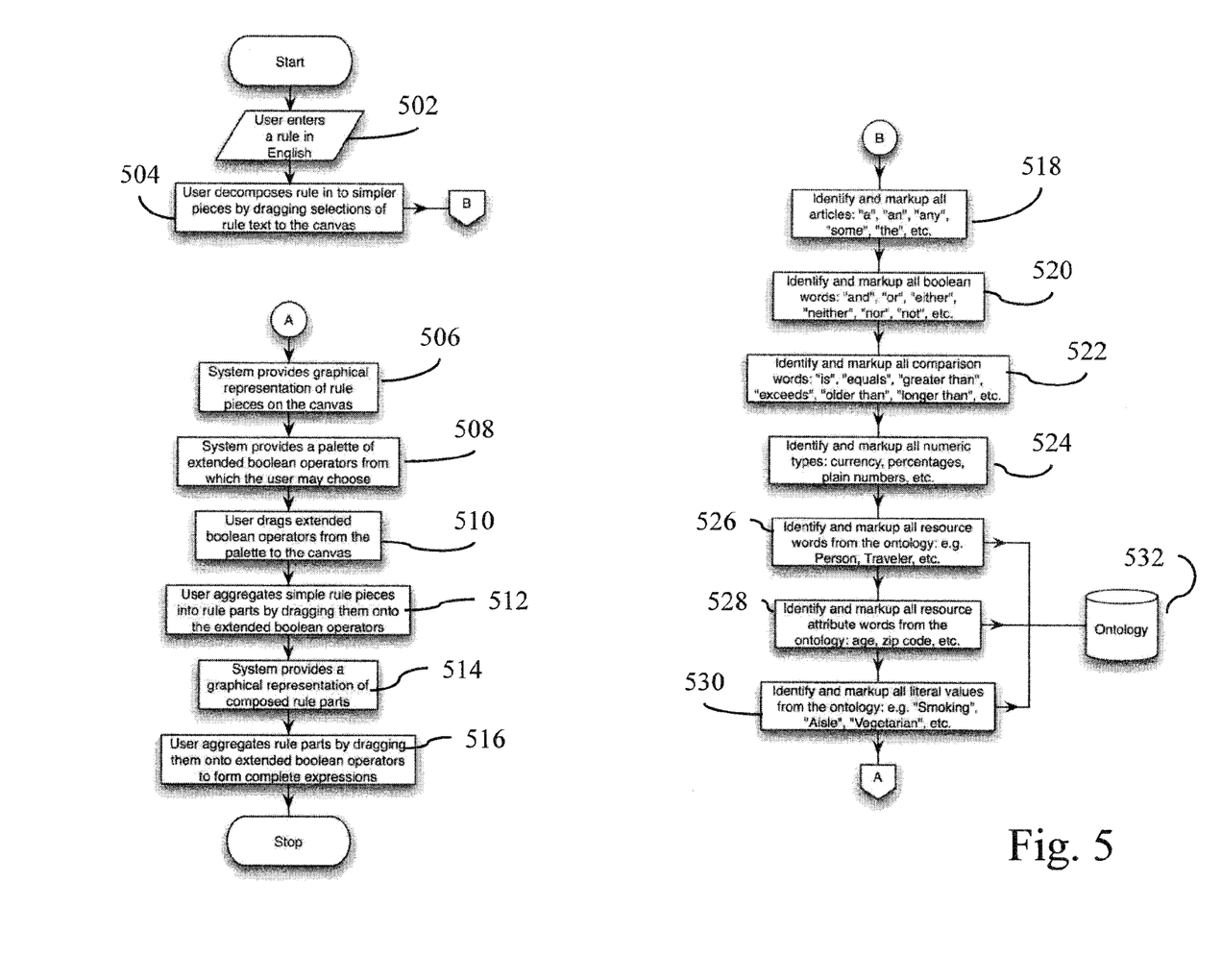
FIG. 5 is a flow diagram illustrating method steps of the present disclosure in one embodiment.

FIG. 5 is a flow diagram illustrating method steps and user interactions in one embodiment of the present disclosure. At 502, the user enters a rule in English, for example, into a text field of a user interface. An example of the text field in a user interface is shown in FIG. 4 at 402. Referring back to FIG. 5, at 504, the user decomposes the rule into simpler pieces by dragging selections of the rule text to the canvas area (FIG. 4, 404) of the user interface. At 506, graphical representation of rule pieces is provided on the canvas. The graphical representation expresses the rule text entered in natural language in logical expression. Examples of graphical representation are shown in FIG. 4 at 406 and 408. At 508, a palette of extended Boolean operators (FIG. 4 418) from which the user may choose may also be provided on the canvas.

At 510, the user may drag extended Boolean operators from the palette to the canvas. Examples of the dragged extended Boolean operators are shown in FIG. 4 at 410 and 412. At 512, the user may aggregate simple rule pieces into rule parts by dragging them onto the extended Boolean operators. For instance, FIG. 4 at 410 shows the rule portion dragged into the ALL operator. At 514, graphical representation of composed rule parts is provided (FIG. 4 414). At 516, the user may aggregate rule parts by dragging them onto extended Boolean operators to form complete expressions (FIG. 4, 414 and 416).

A computer module or modules that perform the functions described above in the user interface program or computer processor is fully described in U.S. patent application Ser. No. 12/497,370 entitled "METHOD AND SYSTEM FOR SMART MARK-UP OF NATURAL LANGUAGE BUSINESS RULES." For instance, referring back to FIG. 5, at 518, a computer module, processor or like identifies and marks up all articles such as "a", "an", "any", "some", "the". At 520, the module identifies all Boolean words, e.g., "and", "or", "either", "neither", "nor", "not", etc. At 522, the module identifies and marks up all comparison words such as "is", "equal", "greater than", "exceeds", "older than", "longer than". At 524, the module identifies and marks up all numeric types, e.g., currency, percentages, plain number, etc. At 526, the module identifies and marks up all resource words from the ontology 532, e.g., person, traveler, etc. At 528, the module identifies and marks up all resource attribute words from the ontology 532, e.g., age, zip code, etc. At 530, the module identifies and marks up all literal values from the ontology, e.g., "smoking", "aisle", "vegetarian", etc.

Using such methods, the entered rule is analyzed and pieces of rules the user selected is converted into logical Boolean expressions. While existing rule editors require correctly formed expressions working in a "left to right" fashion and do not allow the user to build up the rule in a piecewise fashion, the system and method of the present disclosure allows the user to start at any point in the rule creation and formalization process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
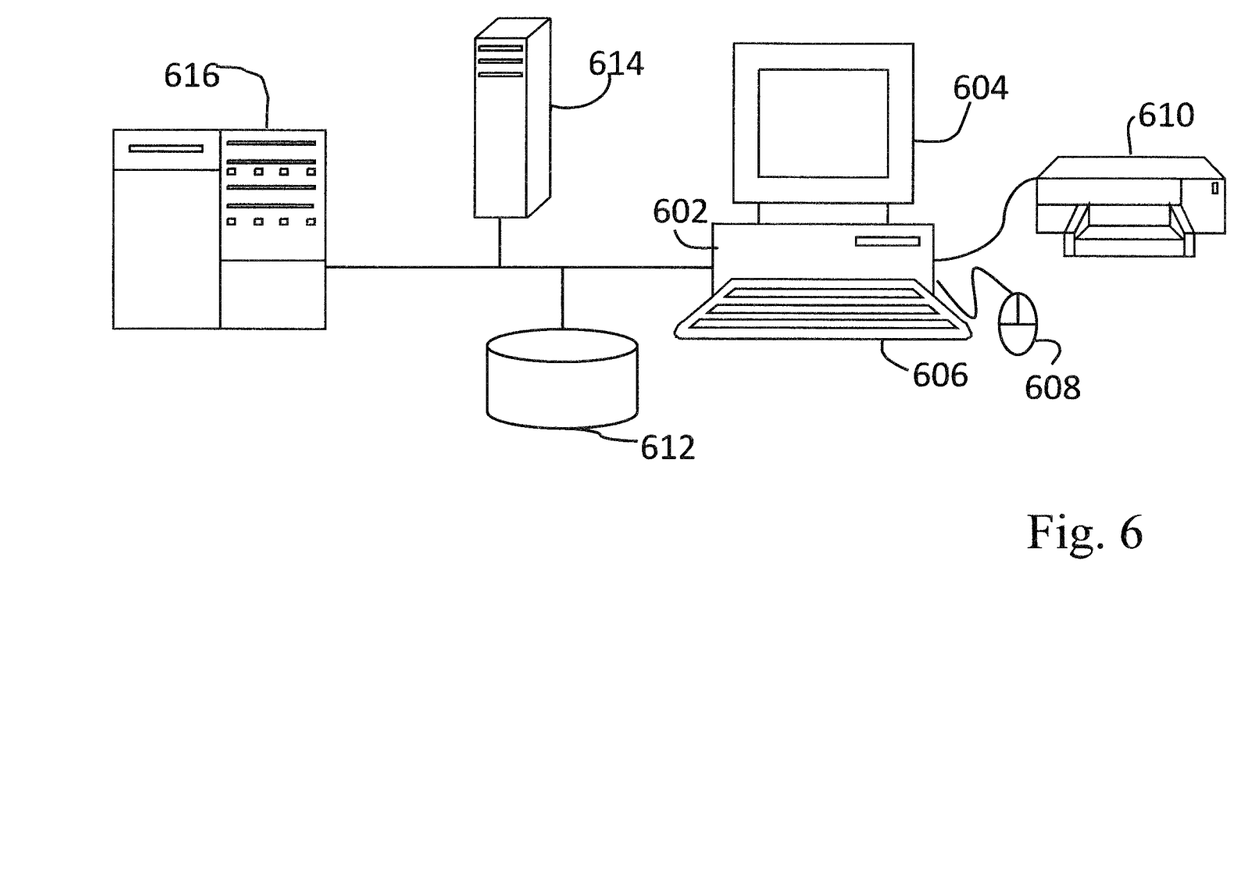
FIG. 6 illustrates an example of a computer system, in which the systems and methodologies of the present disclosure may be carried out or executed.

Referring now to FIG. 6, the systems and methodologies of the present disclosure may be carried out or executed in a computer system that includes a processing unit 602, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 602 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 604 for presenting output displays and providing a display through which the user may input data and interact with the processing system, for instance, in cooperation with input devices such as the keyboard 606 and mouse device 608 or pointing device. The computer processing system may be also connected or coupled to one or more peripheral devices such as the printer 610, scanner (not shown), speaker, and any other devices, directly or via remote connections. The computer processing system may be connected or coupled to one or more other processing systems such as a server 610, other remote computer processing system 614, network storage devices 612, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 602, 614, 616), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of modularly authoring and visualizing rules using trees, comprising:
   parsing a natural language expression including a plurality of rule pieces;
   determining a plurality of logic words used in the natural language expression;
   receiving one or more user selected portions of said natural language expression, said one or more user selected portions being one or more rule pieces forming the natural language expression;
   converting said one or more user selected portions of said natural language expression into corresponding logical expressions based on said plurality of logic words and presenting said logical expressions graphically;
   presenting one or more extended Boolean operators;
   enabling a user to select said one or more extended Boolean operators and further drag and drop said graphically represented logical expressions into said one or more extended Boolean operators, each of the extended Boolean operators presented as a canvas into which said graphically represented logical expressions can be dropped;
   aggregating said logical expressions into said one or more extended Boolean operators; and
   building a parse tree comprising nested canvases of extended Boolean expressions comprising said aggregated logical expressions,
   wherein the user is enabled to incrementally and visually build said aggregated logical expression out of the plurality of rule pieces in the natural language expression starting from any user selected portion in the natural language expression to formalize the natural language expression.

2. The method of claim 1, further including:
   displaying the parse tree using visual effects.

3. The method of claim 1, wherein said extended Boolean operators include an ALL operator.

4. The method of claim 1, wherein said extended Boolean operators include an ANY operator.

5. The method of claim 1, wherein said extended Boolean operators include a NOT ALL operator.

6. The method of claim 1, wherein said extended Boolean operators include a NONE operator.

7. The method of claim 1, further including:
   providing a user interface wherein said natural language expression is entered via the user interface and said parse tree, said one or more extended Boolean operators, and said converted logical expressions are presented via the user interface.

8. A non-transitory program storage device readable by a machine, tangibly embodying a program of instructions executable by the machine to perform a method of modularly authoring and visualizing rules using trees, comprising:
   parsing a natural language expression including a plurality of rule pieces;
   determining a plurality of logic words used in the natural language expression;
   receiving one or more user selected portions of said natural language expression, said one or more user selected portions being one or more rule pieces forming the natural language expression;
   converting said one or more user selected portions of said natural language expression into corresponding logical expressions based on said plurality of logic words and presenting said logical expressions graphically;
   presenting one or more extended Boolean operators;
   enabling a user to select said one or more extended Boolean operators and further drag and drop said graphically represented logical expressions into said one or more extended Boolean operators, each of the extended Boolean operators presented as a canvas into which said graphically represented logical expressions can be dropped;
   aggregating said logical expressions into said one or more extended Boolean operators; and
   building a parse tree comprising nested canvases of extended Boolean expressions comprising said aggregated logical expressions,
   wherein the user is enabled to incrementally and visually build said aggregated logical expression out of the plurality of rule pieces in the natural language expression starting from any user selected portion in the natural language expression to formalize the natural language expression.

9. The program storage device of claim 8, further including:
   displaying the parse tree using visual effects.

10. The program storage device of claim 8, wherein said extended Boolean operators include an ALL operator.

11. The program storage device of claim 8, wherein said extended Boolean operators include an ANY operator.

12. The program storage device of claim 8, wherein said extended Boolean operators include a NOT ALL operator.

13. The program storage device of claim 8, wherein said extended Boolean operators include a NONE operator.

14. The program storage device of claim 8, further including:
   providing a user interface wherein said natural language expression is entered via the user interface and said parse tree, said one or more extended Boolean operators, and said converted logical expressions are presented via the user interface.

15. A system for modularly authoring and visualizing rules using trees, comprising:
   a processor;
   ontology of words database;
   a parser module operable to parse a natural language expression including a plurality of rule pieces; and
   an analysis module operable to determine a plurality of logic words used in the natural language expression based the ontology of words database, the module further operable to receive one or more user selected portions of said natural language expression, said one or more user selected portions being one or more rule pieces forming the natural language expression, convert said one or more user selected portions of said natural language expression into corresponding logical expressions based on said plurality of logic words and present said logical expressions graphically, present one or more extended Boolean operators, enable a user to select said one or more extended Boolean operators and further drag and drop said graphically represented logical expressions into said one or more extended Boolean operators, each of the extended Boolean operators presented as a canvas into which said graphically represented logical expressions can be dropped, aggregate said logical expressions into said one or more extended Boolean operators, and build a parse tree comprising nested canvases of extended Boolean expressions comprising said aggregated logical expressions, wherein the user is enabled to incrementally and visually build said aggregated logical expression out of the plurality of rule pieces in the natural language expression starting from any user selected portion in the natural language expression to formalize the natural language expression.

16. The system of claim 15, further including a user interface module wherein said natural language expression is entered via the user interface and said parse tree, said one or more extended Boolean operators, and said converted logical expressions are presented via the user interface.

17. The system of claim 15, wherein said extended Boolean operators include an ALL operator.

18. The system of claim 15, wherein said extended Boolean operators include an ANY operator.

19. The system of claim 15, wherein said extended Boolean operators include a NOT ALL operator.

20. The system of claim 15, wherein said extended Boolean operators include a NONE operator.

* * * * *